(12) United States Patent
Suzuki et al.

(10) Patent No.: US 11,703,376 B2
(45) Date of Patent: Jul. 18, 2023

(54) FAILURE DIAGNOSIS SYSTEM

(71) Applicant: SUMITOMO HEAVY INDUSTRIES, LTD., Tokyo (JP)

(72) Inventors: Kota Suzuki, Aichi (JP); Mikio Komatsu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/018,323

(22) Filed: Sep. 11, 2020

(65) Prior Publication Data

US 2020/0408591 A1 Dec. 31, 2020

Related U.S. Application Data

(63) Continuation of application No. PCT/JP2019/009149, filed on Mar. 7, 2019.

(30) Foreign Application Priority Data

Mar. 16, 2018 (JP) .............................. JP2018-049116

(51) Int. Cl.
*G01M 99/00* (2011.01)
*G01H 1/00* (2006.01)
(Continued)

(52) U.S. Cl.
CPC .......... *G01H 1/003* (2013.01); *G01M 13/028* (2013.01); *G01M 17/00* (2013.01); *G01M 99/00* (2013.01); *H02P 29/024* (2013.01)

(58) Field of Classification Search
CPC .... G01H 1/003; G01M 13/028; G01M 17/00; G01M 99/00; G01M 7/00; G01M 13/00; H02P 29/024
See application file for complete search history.

(56) References Cited

U.S. PATENT DOCUMENTS 6,192,325 B1 * 2/2001 Piety ........................ G06N 5/00
702/183
8,478,548 B2 * 7/2013 Hudson ............... G01M 99/005
702/56

(Continued)

FOREIGN PATENT DOCUMENTS

EP   2 345 878 A2   7/2011
JP   2001-025712 A  1/2001
(Continued)

OTHER PUBLICATIONS

International Search Report issued in Application No. PCT/JP2019/009149, dated Jun. 4, 2019.
(Continued)

*Primary Examiner* — Freddie Kirkland, III
(74) *Attorney, Agent, or Firm* — Michael Best & Friedrich LLP

(57) ABSTRACT

A failure diagnosis system includes a sensor that is provided in a diagnosis target device and detects diagnosis target information of the diagnosis target device, an abnormality determination unit that determines whether or not an abnormality occurs in the diagnosis target device based on the diagnosis target information detected by the sensor, a storage unit that stores a site of the diagnosis target device where the abnormality determination is possible and a sensor installation location where a sensor needs to be installed for the abnormality determination of the site, a designation reception unit that receives designation of a site where the abnormality determination is performed, and a presentation unit that executes predetermined presentation processing. The presentation processing by the presentation unit includes processing of presenting the sensor installation location where the sensor needs to be installed to perform the abnormality determination of the designated site.

18 Claims, 5 Drawing Sheets

(51) Int. Cl.
  *G01M 13/028*  (2019.01)
  *G01M 17/00*  (2006.01)
  *H02P 29/024*  (2016.01)

(56) References Cited

U.S. PATENT DOCUMENTS

| | | | |
|---|---|---|---|
| 8,924,163 B2* | 12/2014 | Hudson | G05B 23/0245 |
| | | | 702/56 |
| 10,339,785 B2* | 7/2019 | Suzuki | G05B 19/4184 |
| 10,533,920 B2* | 1/2020 | Wascat | G01H 1/003 |
| 2001/0001851 A1 | 5/2001 | Piety et al. | |
| 2011/0178737 A1* | 7/2011 | Hudson | G01H 1/003 |
| | | | 702/56 |
| 2013/0282335 A1* | 10/2013 | Hudson | G01H 1/003 |
| | | | 702/183 |
| 2016/0041070 A1 | 2/2016 | Wascat et al. | |
| 2017/0102295 A1 | 4/2017 | Komatsu et al. | |
| 2018/0059656 A1* | 3/2018 | Hiruta | G01R 31/343 |
| 2018/0286212 A1* | 10/2018 | Suzuki | G05B 23/0267 |

FOREIGN PATENT DOCUMENTS

| | | |
|---|---|---|
| JP | 2017-075795 A | 4/2017 |
| JP | 2018-173333 A | 11/2018 |

OTHER PUBLICATIONS

Search Report issued in European Application No. 19767177.9, dated Apr. 7, 2021.

\* cited by examiner

FAILURE DIAGNOSIS SYSTEM

RELATED APPLICATIONS

The contents of Japanese Patent Application No. 2018-049116, and of International Patent Application No. PCT/JP2019/009149, on the basis of each of which priority benefits are claimed in an accompanying application data sheet, are in their entirety incorporated herein by reference.

BACKGROUND

Technical Field

Certain embodiment of the present invention relates to a failure diagnosis system.

Description of Related Art

There is a known failure diagnosis system for detecting a failure of a device (diagnosis target device) such as a motor, a gear motor, or a gear box. The failure diagnosis system generally includes a sensor disposed in a diagnosis target device and a processing unit that determines whether or not an abnormality occurs in the diagnosis target device based on information from the sensor. In the related art, for example, a failure diagnosis system as described in the related art has been proposed.

SUMMARY

According to an aspect of the present invention, there is provided a failure diagnosis system including a sensor that is provided in a diagnosis target device and detects diagnosis target information of the diagnosis target device, an abnormality determination unit that determines whether or not an abnormality occurs in the diagnosis target device based on the diagnosis target information detected by the sensor, a storage unit that stores a site of the diagnosis target device where the abnormality determination is possible and a sensor installation location where a sensor needs to be installed for the abnormality determination of the site, a designation reception unit that receives designation of a site where the abnormality determination is performed, and a presentation unit that executes predetermined presentation processing. The presentation processing by the presentation unit includes processing of presenting the sensor installation location where the sensor needs to be installed to perform the abnormality determination of the designated site.

Another aspect of the present invention is also a failure diagnosis system. The failure diagnosis system includes a sensor that is provided in a diagnosis target device and detects diagnosis target information of the diagnosis target device, an abnormality determination unit that determines whether or not an abnormality occurs in the diagnosis target device based on the diagnosis target information detected by the sensor, a storage unit that stores a site of the diagnosis target device where the abnormality determination is possible and a sensor installation location where a sensor needs to be installed for the abnormality determination of the site, a designation reception unit that receives designation of a sensor installation site, and a presentation unit that executes predetermined presentation processing. The presentation processing by the presentation unit includes processing of presenting the site where the abnormality determination is possible by installing the sensor at the designated sensor installation location.

Still another aspect of the present invention is also a failure diagnosis system. The failure diagnosis system includes a sensor that is provided in a diagnosis target device and detects diagnosis target information of the diagnosis target device, an abnormality determination unit that determines whether or not an abnormality occurs in the diagnosis target device based on the diagnosis target information detected by the sensor, a storage unit that stores a site of the diagnosis target device where the abnormality determination is possible and a sensor installation location where a sensor needs to be installed for the abnormality determination of the site, and a presentation unit that executes predetermined presentation processing. The presentation processing by the presentation unit includes processing of presenting a correspondence relationship between the site of the diagnosis target device where the abnormality determination is possible and the sensor installation location where the sensor needs to be installed for the abnormality determination of the site.

DETAILED DESCRIPTION

Figure 1:
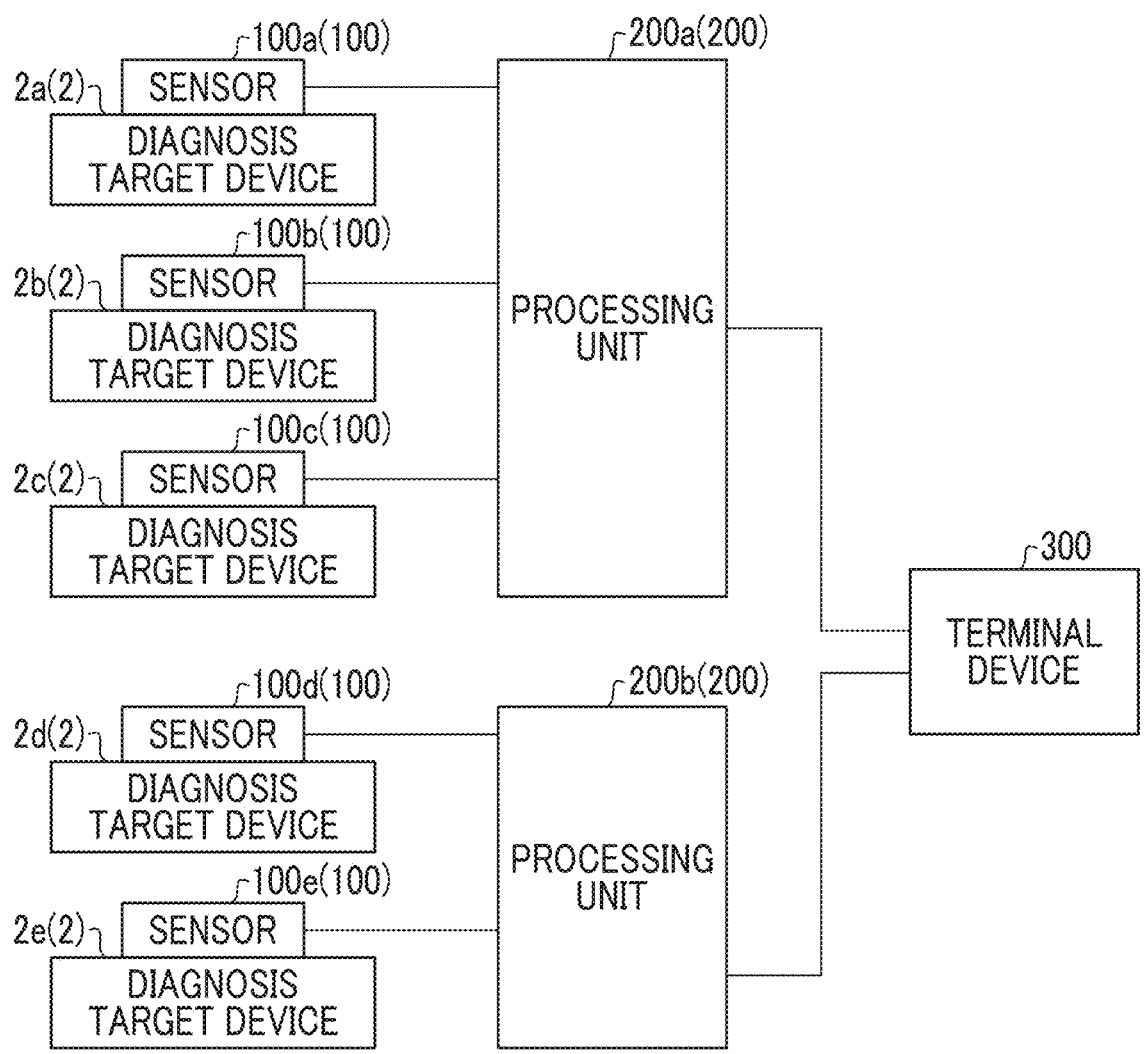
FIG. 1 is a schematic diagram showing a configuration of a failure diagnosis system according to an embodiment.

It is desirable to provide a highly convenient failure diagnosis system in which a sensor can be easily installed to a diagnosis target device.

According to the present invention, it is possible to provide the highly convenient failure diagnosis system in which the sensor can be easily installed in the diagnosis target device.

Hereinafter, the same reference numeral is assigned to the same or equivalent constituent element, member, and step shown in each drawing, and duplicate description will be omitted as appropriate. A dimension of the member in each drawing is enlarged and reduced as appropriate for easy understanding. A part of the member that is not important for describing the embodiment is omitted and displayed in each drawing.

FIG. 1 is a schematic diagram showing a configuration of a failure diagnosis system 10 according to the embodiment. The failure diagnosis system 10 detects an abnormality in a plurality of diagnosis target devices 2a to 2e collectively referred to as a diagnosis target device 2 and supports an analysis thereof. In the present embodiment, a case where the diagnosis target device 2 is a gear motor will be described. However, the diagnosis target device 2 may be another device such as a motor, a gear box, an engine, an injection molding machine, a machine tool, or an industrial robot.

The failure diagnosis system 10 includes sensors 100a to 100e collectively referred to as a sensor 100, processing units 200a and 200b collectively referred to as a processing unit 200, and a terminal device 300 which is an information processing terminal operated by a user. The sensor 100 is connected to the processing unit 200 by wire. The processing unit 200 is connected to the terminal device 300 by wire or wirelessly.

The sensors 100a to 100e are respectively attached to the diagnosis target devices 2a to 2e. The sensor 100 is a vibration sensor in the present embodiment, detects vibration occurring in a corresponding diagnosis target device 2 (that is, to which the sensor 100 is attached), generates vibration information (diagnosis target Information) indicating magnitude of the vibration, and transmits the information to the processing unit 200. In FIG. 1, one sensor 100 is attached to each diagnosis target device 2. However, a required number of sensors 100 are actually installed at required installation locations according to a site where abnormality determination (described below) is performed.

The processing unit 200 repeatedly executes the "abnormality determination" that determines whether or not the abnormality occurs in the corresponding diagnosis target device 2 based on the vibration information transmitted from each sensor 100. The processing unit 200 transmits a determination result to the terminal device 300. The user checks the determination result transmitted to the terminal device 300 and can know whether or not the abnormality occurs in the diagnosis target device 2. In FIG. 1, three sensors 100 are connected to the processing unit 200a and two sensors 100 are connected to the processing unit 200b. However, the number of sensors 100 connected to each processing unit 200 is not particularly limited as long as the number of sensors 100 is within a range of the number of sensor connection channels of each processing unit 200.

Figure 2:
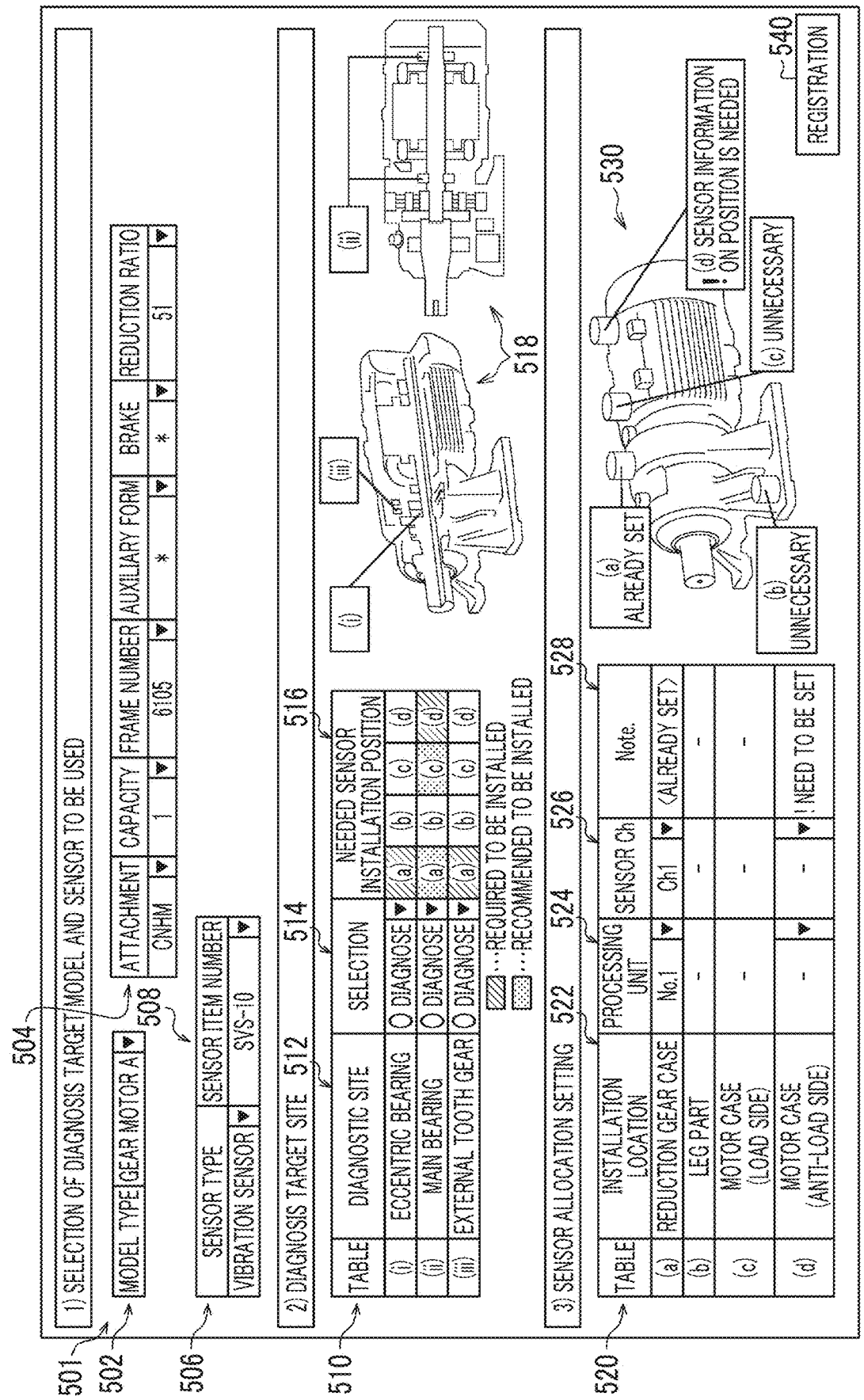
FIG. 2 is a diagram showing a support screen.

FIG. 2 shows a support screen provided by the failure diagnosis system 10. The support screen is a screen mainly for supporting the user relating to the installation of the sensor 100. In the present embodiment, the terminal device 300 provides the support screen as described below.

A model information region 501 is a region where model information of the diagnosis target device 2 is displayed and includes a model type field 502 and a specification field 504 in the present embodiment. In the model type field 502, a model type of the gear motor is input in a selection form in this example as the model type of the diagnosis target device. In the specification field 504, a specification of the diagnosis target device of the model type input into the model type field 502 is input in a selection form. Here, attachment method, capacity, frame number, auxiliary form, presence/absence of brake, and reduction ratio of the diagnosis target device can be input. In a sensor type field 506 and a sensor item number field 508, a type and an item number of the sensor 100 actually installed or to be installed in the diagnosis target device are respectively input in a selection form. As described above, since the sensor 100 according to the present embodiment is the vibration sensor, "vibration sensor" is input in the sensor type field 506 in FIG. 2.

A diagnostic site list table 510 includes a diagnostic site field 512, a selection field 514, and a sensor installation location field 516. A list of sites of the diagnosis target device (hereinafter also referred to as "diagnostic site") where the abnormality can be determined is displayed in the diagnostic site field 512. Respective diagnostic sites in the diagnostic site field 512 may be displayed in an order in which the diagnosis is recommended, specifically in an order in which the failure is likely to occur.

In the selection field 514, whether or not to diagnose each diagnostic site in the diagnostic site field 512 is input in a selection form.

The sensor installation location field 516 displays a sensor installation location in the diagnosis target device 2 for which the sensor 100 needs to be installed to perform the diagnosis for each diagnostic site in the diagnostic site field 512. That is, the diagnostic site list table 510 presents a correspondence relationship between each diagnostic site where the abnormality can be determined and the sensor installation location where the sensor 100 needs to be installed for determining the abnormality of each diagnostic site. In this example, the sensor installation location field 516 displays whether the sensor 100 needs to be installed at each installation location, is recommended to be installed, or is not required to be installed, for each diagnostic site. In the sensor installation location field 516, the sensor installation location where the sensor 100 needs to be installed may be displayed only for a site where "diagnose" is selected in the selection field 514, or the sensor installation location where the sensor 100 needs to be installed may be displayed for all the sites regardless of the selection in the selection field 514.

The user refers to the diagnostic site list table 510 to know the sensor installation location where the sensor 100 is required to be installed to diagnose each diagnostic site. When the sensor 100 is installed at each sensor installation location, the user can know which location of the diagnosis target device 2 can be determined for the abnormality.

The diagnosability of each diagnostic site in the diagnostic site field 512 may be different according to a sensor item number input into the sensor item number field 508, specifically, the responsiveness of the sensor 100 having the input sensor item number. The diagnosability of each diagnostic site in the diagnostic site field 512 may be different according to the sensor item number input into the sensor item number field 508, for example, such that the abnormality of an external tooth gear can be determined by installing the sensor at a sensor installation location (a) in a case where a sensor item number of a sensor having relatively high responsiveness is selected in the sensor item number field 508, and the abnormality of the external tooth gear cannot be determined even though the sensor is installed at the sensor installation location (a) in a case where a sensor item number of a sensor having relatively low responsiveness is selected in the sensor item number field 508.

An internal structure diagram 518 of the diagnosis target device 2 is displayed on the right side of the diagnostic site list table 510. The internal structure diagram 518 is a schematic diagram showing an internal structure of the diagnosis target device 2 corresponding to the model information selected in the model information region 501, that is, corresponding to the model type selected in the model type field 502 and the specification selected in the specification field 504. In this example, the internal structure diagram 518 is a cross-sectional view of the diagnosis target device 2. Each diagnostic site in the diagnostic site field 512 is indicated in the internal structure diagram 518. The user refers to the internal structure diagram 518 together with the diagnostic site list table 510 and thus can visually grasp each diagnostic site in the diagnostic site field 512.

The sensor allocation table 520 includes an installation location field 522, a processing unit field 524, and a Note field 528. A list of sensor installation locations where the sensor 100 can be installed in the diagnosis target device 2 is displayed in the installation location field 522. Identification information of the processing unit to which the sensor 100 actually installed or to be installed at the sensor installation location is connected, and identification information of the sensor connection channel to which the sensor 100 is connected are respectively input in the processing unit field 524 and a sensor Ch field 526, in a selection form.

The Note field 528 displays information indicating that the sensor 100 needs to be installed for the sensor installation location where the sensor 100 needs to be installed for the abnormality determination of the site where "diagnose" is selected in the selection field 514 of the diagnostic site list table 510. In this example, at the sensor installation location where the sensor 100 needs to be installed, "already set" is displayed when the processing unit field 524 and the sensor Ch field 526 are already set and "need to be set" is displayed when the processing unit field 524 and the sensor Ch field 526 are not yet set. On the other hand, "-" is displayed at an installation location where the sensor 100 does not need to be installed. That is, the Note field 528 presents the installation location where the sensor needs to be installed to perform the abnormality determination of the selected (designated) diagnostic site.

An external view 530 of the diagnosis target device 2 is displayed on the right side of the sensor allocation table 520. The external view 530 is a schematic diagram showing the external appearance of the diagnosis target device 2 corresponding to the model information selected in the model information region 501. Each sensor installation location in the installation location field 522 is indicated in the external view 530. In this example, a sensor icon is illustrated at each sensor installation location. The sensor icon is displayed in a mode that whether or not the sensor needs to be installed at the installation location is known. For example, a sensor icon at the sensor installation location where the sensor needs to be installed is displayed in a different color from a sensor icon at the sensor installation location where the sensor 100 does not need to be installed. In this example, the sensor icon of the sensor installation location where the sensor 100 needs to be installed is displayed in green when the processing unit field 524 and the sensor Ch field 526 are already input, and is displayed in red when the fields are not yet input. The sensor icon at the sensor installation location where the sensor 100 does not need to be installed is displayed in gray. As a modification example, the sensor icon may not be displayed at the sensor installation location where the sensor 100 does not need to be installed.

The information "already set" is displayed when the processing unit field 524 and the sensor Ch field 526 are already input, and information "sensor information is needed" is displayed when the fields are not yet input, adjacent to the sensor icon of the sensor installation location where the sensor 100 needs to be installed. Information "unnecessary" is displayed adjacent to the sensor icon at the sensor installation location where the sensor 100 does not need to be installed.

When a registration button 540 is pressed, a setting value of each item input in FIG. 2 is transmitted to the processing unit 200 input into the processing unit field 524 and registered.

Figure 3:
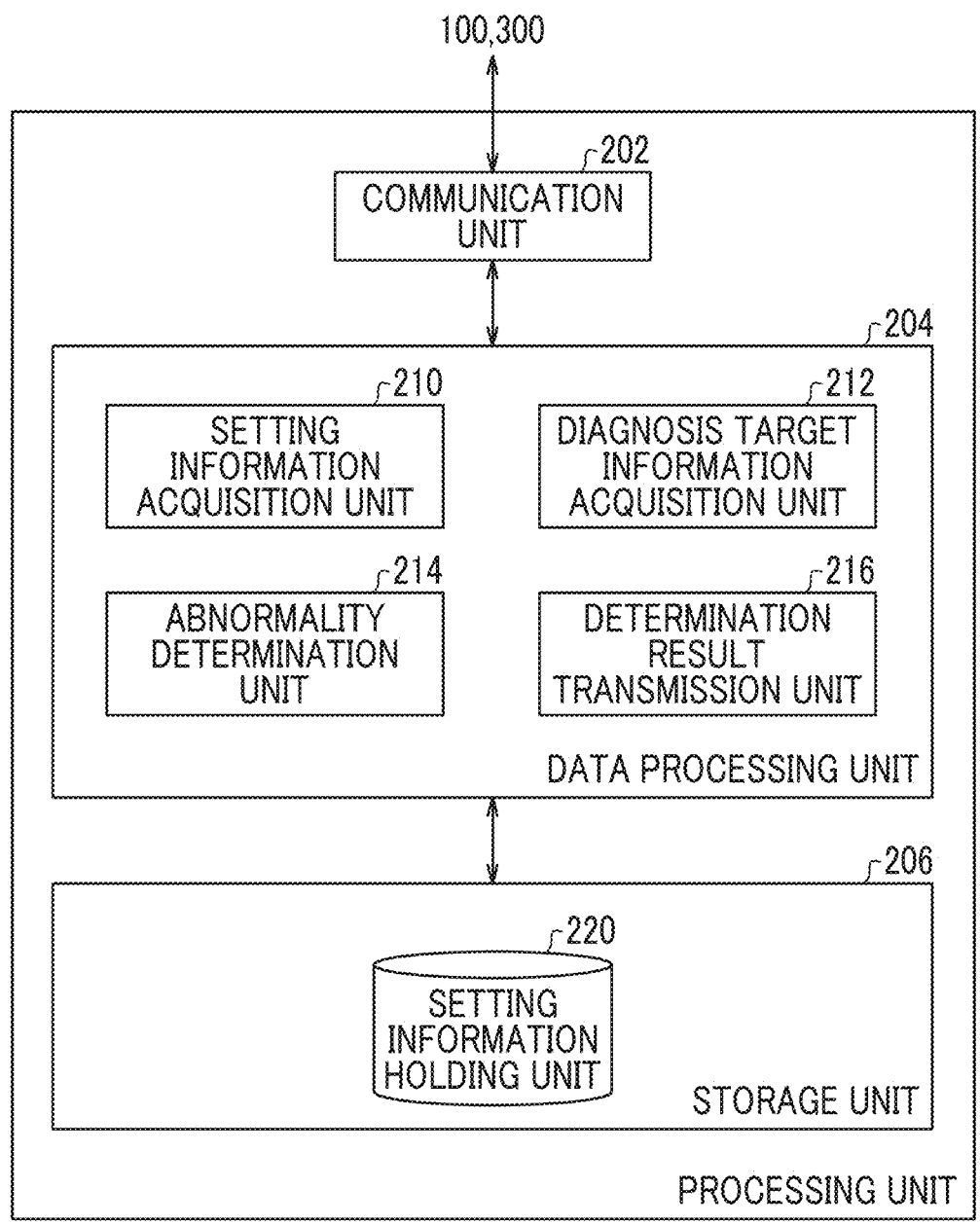
FIG. 3 is a block diagram showing functions and a configuration of a processing unit in FIG. 1.

FIG. 3 is a block diagram showing functions and a configuration of the processing unit 200. Each block shown here can be realized by an element such as a CPU and a memory of a computer or a mechanical device in terms of hardware, and can be realized by a computer program or the like in terms of software. Here, functional blocks realized by cooperation of the hardware and the software are drawn. Therefore, it will be understood by those skilled in the art that the functional blocks can be realized in various manners by a combination of the hardware and the software. The same applies to the subsequent block diagrams.

The processing unit 200 includes a communication unit 202 that executes communication processing with the sensor 100 and the terminal device 300 according to various communication protocols, a data processing unit 204 that executes diagnostic processing, and a storage unit 206 that stores various pieces of data for the data processing.

The storage unit 206 includes a setting information holding unit 220. The setting information holding unit 220 holds various pieces of setting information. For example, the setting information holding unit 220 holds the information input in each item on the support screen of FIG. 2.

The data processing unit 204 includes a setting information acquisition unit 210, a diagnosis target information acquisition unit 212, an abnormality determination unit 214, and a determination result transmission unit 216. The setting information acquisition unit 210 acquires various pieces of setting information transmitted from the terminal device 300 and registers the setting information in the setting information holding unit 220. For example, the setting information acquisition unit 210 acquires the information input from each item on the support screen of FIG. 2 transmitted from the terminal device 300 and registers the information in the setting information holding unit 220. The diagnosis target information acquisition unit 212 acquires vibration information from each sensor 100 at a preset diagnostic processing interval at a preset sampling frequency for a preset measurement time.

The abnormality determination unit 214 determines whether or not the abnormality occurs, based on the diagnosis target information acquired from the corresponding sensor 100, for each diagnostic site where "diagnose" is selected in the selection field 514 of the diagnostic site list table 510 on the support screen of FIG. 2. Specifically, the abnormality determination unit 214 determines whether or not the abnormality occurs, for each diagnostic site, in consideration of the diagnosis target information acquired from the sensor 100 in a case where the sensor 100 is also installed at a sensor installation location where the installation is recommended, in addition to the diagnosis target information acquired from the sensor 100 installed at the sensor installation location where the sensor 100 needs to be installed for the abnormality determination. For example, in the abnormality determination unit 214, determination may be made by a diagnosis method selected in advance from among "peak value diagnosis", "effective value diagnosis", "FFT diagnosis" and "H-FFT diagnosis".

The peak value diagnosis is a diagnosis method of determining that the abnormality occurs in a case where the magnitude of a peak value (distance between maximum value and minimum value of amplitude within measurement time) of vibration indicated by the vibration information exceeds a predetermined threshold value.

The effective value diagnosis is a diagnosis method of determining that the abnormality occurs in a case where the magnitude of an effective value (root square mean of vibration within measurement time) of the vibration indicated by the vibration information exceeds a predetermined threshold value.

The FFT diagnosis is a diagnosis method of determining that the abnormality occurs in a case where fast Fourier transform (FFT) is executed on a vibration waveform based on vibration information and a value obtained by adding vibration components of a plurality of specific frequencies among vibration components of respective frequencies obtained as a result exceeds a predetermined threshold value.

The H-FFT diagnosis is a diagnosis method of determining that the abnormality occurs in a case where the FFT is executed on the envelope of the vibration waveform based on the vibration information and a value obtained by adding vibration components of a plurality of specific frequencies among vibration components of respective frequencies obtained as a result exceeds a predetermined threshold value.

In the FFT diagnosis and the H-FFT diagnosis, the vibration components of the frequencies according to the model information (that is, model type and specification) of the diagnosis target device 2 and/or the diagnostic site where the abnormality is determined may be added, or weighting when the vibration information is added according to the model information and/or the diagnostic site where the abnormality is determined may be changed.

The determination result transmission unit 216 transmits the determination result by the abnormality determination unit 214 to the terminal device 300 through the communication unit 202. Specifically, the determination result transmission unit 216 transmits the determination result of each diagnostic site together with information that can specify each diagnostic site.

Figure 4:
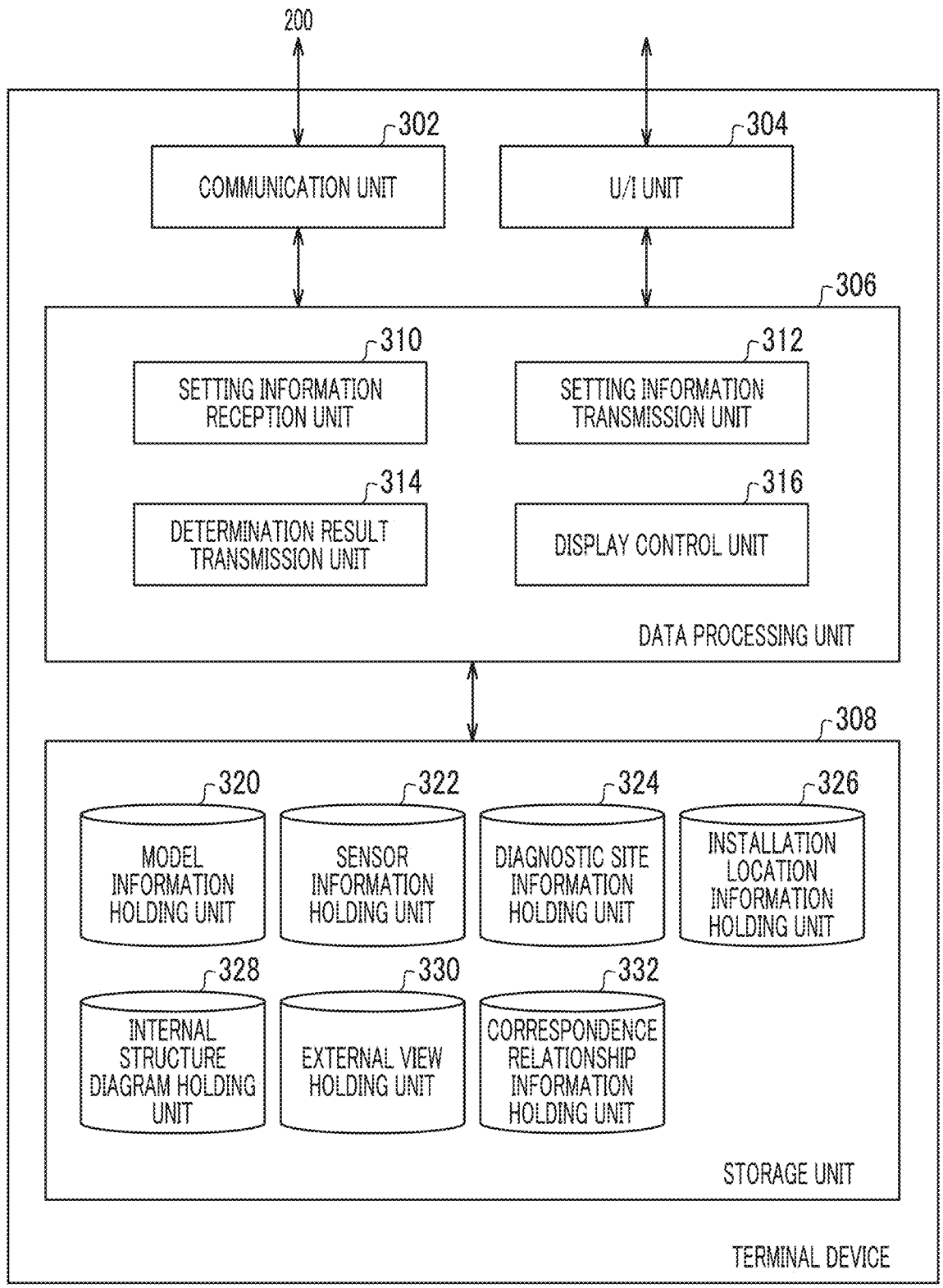
FIG. 4 is a block diagram showing functions and a configuration of a terminal device in FIG. 1.

FIG. 4 is a block diagram showing functions and a configuration of the terminal device 300. The terminal device 300 includes a communication unit 302 that executes communication processing with the processing unit 200 according to various communication protocols, a U/I unit 304 that receives an operation input by the user and displays various screens on a display unit in response to an instruction from a data processing unit 306, the data processing unit 306 that executes various pieces of data processing based on the data acquired from the communication unit 302 and the U/I unit 304, and a storage unit 308 that stores the data to be referred to and updated by the data processing unit 306.

The storage unit 308 includes a model information holding unit 320, a sensor information holding unit 322, a diagnostic site information holding unit 324, an installation location information holding unit 326, an internal structure diagram holding unit 328, an external view holding unit 330, and a correspondence relationship holding unit 332.

The model information holding unit 320 holds the model type of the diagnosis target device 2 and specification information thereof in association with each other. That is, the model information holding unit 320 holds the model information. The sensor information holding unit 222 holds the type of the sensor and the item number of the sensor in association with each other.

The diagnostic site information holding unit 324 holds the site (diagnostic site) of the diagnosis target device where the abnormality can be determined and a position in an internal structure diagram of the site in association with each other, for each piece of model information of the diagnosis target device (that is, for each model type and for each specification). In a modification example, the diagnostic site information holding unit 324 may hold the type of the sensor, the item number of the sensor, the site (diagnostic site) of the diagnosis target device where the abnormality can be determined, and the position in the internal structure diagram thereof in association with one another, for each piece of model information of the diagnosis target device. In this case, as described above, it is possible to change the diagnosability of the diagnostic site according to the sensor item number input into the sensor item number field 508.

The installation location information holding unit 326 holds the sensor installation location where the sensor 100 may be installed and a position of the sensor installation location in the external view, in other words, a position where the sensor icon is required to be displayed in the external view in FIG. 2 in association with each other, for each piece of model information of the diagnosis target device.

The internal structure diagram holding unit 328 is an internal structure diagram to be displayed in the internal structure diagram 518 in FIG. 2 and holds an internal structure diagram for each piece of model information. The external view holding unit 330 is an external view to be displayed in the external view 530 in FIG. 2 and holds an external view for each piece of model information.

The correspondence relationship holding unit 332 holds the diagnostic site of the diagnosis target device 2 where the abnormality can be determined and he sensor installation location where the sensor 100 needs to be installed to perform the abnormality determination of the diagnostic site in association with each other, for each piece of model information of the diagnosis target device 2.

The data processing unit 306 includes a setting information reception unit (designation reception unit) 310, a setting information transmission unit 312, a determination result acquisition unit 314, and a display control unit (presentation unit) 316. The setting information reception unit 310 receives the information input in each item on the support screen of FIG. 2. When the registration button 540 is pressed on the support screen of FIG. 2, the setting information transmission unit 312 transmits the information received by the setting information reception unit 310 to the processing unit 200.

The determination result acquisition unit 314 acquires the determination result of each connection channel transmitted from each processing unit 200 through the communication unit 302.

The display control unit 316 refers to each holding unit to generate the support screen of FIG. 2 and display the support screen on a predetermined display unit, or updates the support screen based on the information received by the setting information reception unit 310 (that is, information input into the support screen) and displays the updated screen on a predetermined display unit. The display control unit 316 displays the determination result acquired by the determination result acquisition unit 314 on the predetermined display unit through the U/I unit 304.

An operation of the failure diagnosis system 10 configured as above will be described. The user inputs the information to each item on the support screen of FIG. 2. The terminal device 300 transmits the information input into the support screen of FIG. 2 to the processing unit 200. The processing unit 200 executes the abnormality determination (diagnostic processing) for each diagnostic site where "diagnose" is selected on the support screen of FIG. 2 based on various pieces of setting information including the information input into the support screen of FIG. 2. Specifically, when a predetermined start instruction is received, the processing unit 200 acquires the vibration information from the sensor 100 corresponding to each diagnostic site at a preset diagnostic processing interval at a preset sampling frequency for a preset measurement time. Then, the processing unit 200 determines whether or not the abnormality occurs in each diagnostic site based on the acquired vibration information. The processing unit 200 transmits the determination result to the terminal device 300. The terminal device 300 displays the determination result on a predetermined display unit. This allows the user to know whether or not the abnormality occurs in each diagnostic site where "diagnose" is selected on the support screen of FIG. 2.

With the failure diagnosis system 10 according to the embodiment described above, the correspondence relationship between the site of the diagnosis target device where the abnormality can be determined and the sensor installation location where the sensor needs to be installed for the abnormality determination of the site is presented. This allows the user to know where to install the sensor for the abnormality determination of the site desired to be diagnosed. On the contrary, the user can know the diagnostic site where the abnormality can be determined by the sensor 100 actually installed or to be installed at a certain sensor installation location. Therefore, it is possible to perform a precise failure diagnosis without any specialized knowledge of the diagnosis target device 2.

The failure diagnosis system according to the embodiment has been described above. It should be understood by those skilled in the art that these embodiments are mere examples, various modification examples can be made to combinations of the respective constituent elements and respective processing processes, and such modification examples are also within the scope of the present invention. Modification examples will be shown below.

Modification Example 1

In the embodiment, the case where the diagnostic site list table 510 includes the diagnostic site field 512, the selection field 514, and the sensor installation location field 516 has been described, but the present invention is not limited thereto. A configuration may be considered in which the diagnostic site list table 510 does not have the sensor installation location field 516. Even when the diagnostic site list table 510 does not have the sensor installation location field 516, the sensor installation location where the sensor 100 is required to be installed to diagnose each diagnostic site is known by referring to the sensor allocation table 520. That is, in this modification example, the sensor allocation table 520 presents the sensor installation locations where the sensors need to be installed to perform the abnormality determination of the site selected (designated) in the diagnostic site list table 510.

Modification Example 2

Figure 5:
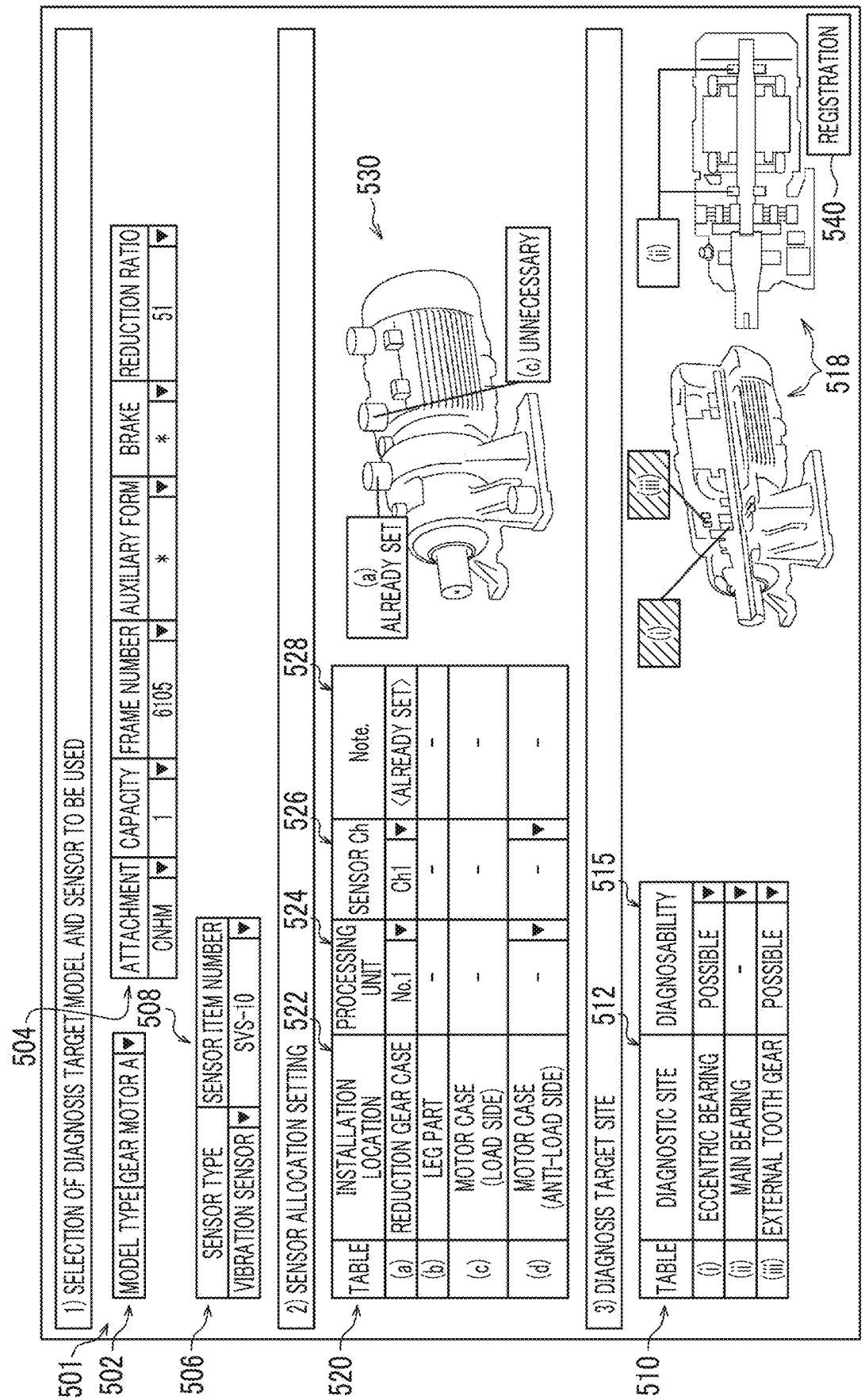
FIG. 5 is a diagram showing a support screen according to a modification example.

FIG. 5 is a diagram showing a support screen according to a modification example. In this modification example, the sensor allocation table 520 is displayed above the diagnostic site list table 510. In the sensor allocation table 520, the sensor installation location where the sensor 100 is actually installed or to be installed is selected (designated). Specifically, information is input into the processing unit field 524 and the sensor Ch field 526 of the sensor installation location where the sensor 100 is actually installed or to be installed. In a case where the processing unit field 524 and the sensor Ch field 526 are already input, the Note field 528 displays information indicating that fact, in this example, information "already set".

The diagnostic site list table 510 according to this modification example includes a diagnostic site field 512 and a diagnosability field 515. The diagnosability field 515 displays whether or not the abnormality determination of each diagnostic site is possible by actually installing the sensor 100 at the sensor installation location selected in the sensor allocation table 520. That is, in the present modification example, the diagnostic site where the abnormality can be determined is presented by installing the sensor 100 at the selected (designated) sensor installation location.

In this modification example, the internal structure diagram 518 indicates which site is the diagnostic site where the abnormality can be determined by actually installing the sensor 100 at the sensor installation location selected in the sensor allocation table 520. For example, as in the example shown in FIG. 5, the diagnostic site where the abnormality can be determined by actually installing the sensor 100 at the sensor installation location selected in the sensor allocation table 520 may be indicated in a different mode, for example, in a different color, from another diagnostic site. For example, only the diagnostic site where the abnormality can be determined may be indicated.

According to this modification example, the user can know the diagnostic site where the abnormality can be determined by the sensor 100 that is actually installed or to be installed at a certain sensor installation location.

Modification Example 3

In the embodiment, the case where the model information region 501 includes the model type field 502 and the specification field 504 has been described. However, a configuration may be employed in which the model information region 501 includes only the model type field 502 when there is no significant difference in external appearance and internal structure due to the difference in the specification. That is, only the model type may be designated as the model information. In this case, the internal structure diagram 518 and the external view 530 may display the internal structure diagram and the external view of a representative diagnosis target device 2 among the diagnosis target devices 2 having the same model type but different specifications.

Modification Example 4

In the embodiment, the case where the terminal device 300 provides the support screen has been described, but the present invention is not limited thereto. The processing unit 200 may provide the support screen. An external device other than the terminal device 300 and the processing unit 200 may provide the support screen.

Modification Example 5

In the embodiment, the case where the failure diagnosis system 10 determines whether or not the abnormality occurs in the diagnosis target device 2 based on the vibration generated in the diagnosis target device 2 which is the gear motor has been described. However, the present invention is not limited thereto. For example, the failure diagnosis system 10 may determine whether or not the abnormality occurs in the diagnosis target device 2 based on at least one of a motor current, a temperature, and iron powder concentration of lubricating oil of the diagnosis target device 2, instead of the vibration generated in the diagnosis target device 2 or in addition to the vibration generated in the diagnosis target device 2. That is, at least one of the information about the motor current, the temperature, or the iron powder concentration of the lubricating oil may be the diagnosis target information, instead of the vibration information or in addition to the vibration information. The same applies to a case where the diagnosis target device 2 is other than the gear motor. That is, the failure diagnosis system 10 may use the diagnosis target information suitable for determining the abnormality of the diagnosis target device.

In the embodiment, the abnormality determination unit is provided in the processing unit 200, and the storage unit, the designation reception unit, and the presentation unit are provided in the terminal device 300. However, each of the units may be provided as the failure diagnosis system and a device provided with each of the units is not limited. For example, the abnormality determination unit may be provided in the terminal device 300 or an external device other than the terminal device. For example, the storage unit, the designation reception unit, and the presentation unit may be provided in a plurality of devices in a distributed manner.

Any combination of the above embodiments and modification examples is also useful as an embodiment of the present invention. A new embodiment generated by the combination has the effects of the combined embodiments and the modification examples.

The present invention can be used for the failure diagnosis system.

It should be understood that the invention is not limited to the above-described embodiment, but may be modified into various forms on the basis of the spirit of the invention. Additionally, the modifications are included in the scope of the invention.

What is claimed is:

1. A failure diagnosis system comprising:
a sensor that is provided in a diagnosis target device and detects diagnosis target information of the diagnosis target device;
an abnormality determination unit that determines whether one abnormality from a plurality of abnormalities occurs in the diagnosis target device based on the diagnosis target information detected by the sensor;
a storage unit that stores one or more sites of the diagnosis target device where determination of the one abnormality is possible and one or more sensor installation locations where the sensor needs to be installed for determination of the one abnormality at the one or more sites;
a designation reception unit that receives designation of a site where the determination of the one abnormality is to be performed at a designated site of the one or more sites; and
a presentation unit that executes predetermined presentation processing,
wherein the presentation processing by the presentation unit includes presenting one of the one or more sensor installation locations where the sensor needs to be installed on the diagnosis target device for the abnormality determination unit to perform the determination of the one abnormality at the designated site.

2. The failure diagnosis system according to claim 1,
wherein the presentation processing by the presentation unit includes presenting a schematic diagram of the diagnosis target device showing the one of the one or more sensor installation locations where the sensor needs to be installed to perform the determination of the one abnormality at the designated site.

3. The failure diagnosis system according to claim 1,
wherein the storage unit stores the site of the diagnosis target device where the determination of the one abnormality is possible and the one or more sensor installation locations where the sensor needs to be installed on the diagnosis target device for the abnormality determination unit to perform the determination of the one abnormality at the designated site, for each piece of model information of the diagnosis target device,
wherein the designation reception unit receives designation of specific model information, and
wherein the presentation unit executes the presentation processing for the diagnosis target device corresponding to the specific model information.

4. The failure diagnosis system according to claim 1,
wherein the presentation processing by the presentation unit includes presenting a schematic diagram of the diagnosis target device showing the one or more sites of the diagnosis target device where the determination of the one abnormality is possible.

5. The failure diagnosis system according to claim 1,
wherein the presentation processing by the presentation unit includes presenting a recommended sensor installation location from the one or more sensor installation locations where the sensor is recommended to be installed for the abnormality determination unit to perform the determination of the one abnormality at the designated site.

6. The failure diagnosis system according to claim 1,
wherein the presentation processing by the presentation unit includes presenting information received by the designation reception unit and the one or more sensor installation locations where the sensor needs to be installed on the diagnosis target device for the abnormality determination unit to perform the determination of the one abnormality at the designated site, at the same time.

7. The failure diagnosis system according to claim 6,
wherein the information received by the designation reception unit includes model information of the diagnosis target device and an item number or a type of the sensor.

8. The failure diagnosis system according to claim 1,
wherein the presentation processing by the presentation unit includes presenting a first location of the one or more sensor installation locations where setting of the sensor is not input in a different mode from a second location of the one or more sensor installation locations where setting of the sensor is input, among the one or more sensor installation locations where the sensor needs to be installed on the diagnosis target device for the abnormality determination unit to perform the determination of the one abnormality at the designated site.

9. The failure diagnosis system according to claim 1,
wherein the designation reception unit receives an input of an item number of the sensor, and
wherein the presentation processing by the presentation unit includes presenting a second site where determination of a second abnormality from the plurality of abnormalities is possible according to the designated item number of the sensor, even when the presented sensor installation location is the same, the second abnormality different from the one abnormality.

10. The failure diagnosis system according to claim 1,
wherein the presentation processing by the presentation unit includes presenting a second site where determination of a second abnormality is possible according to a responsiveness of the sensor, even when the presented sensor installation location is the same, the second abnormality different from the one abnormality.

11. A failure diagnosis system comprising:
a sensor that is provided in a diagnosis target device and detects diagnosis target information of the diagnosis target device;

an abnormality determination unit that determines whether one abnormality from a plurality of abnormalities occurs in the diagnosis target device based on the diagnosis target information detected by the sensor;

a storage unit that stores a site of the diagnosis target device where determination of the one abnormality is possible and a sensor installation location where the sensor needs to be installed for the determination of the one abnormality at the site; and a presentation unit that executes predetermined presentation processing, wherein the presentation processing by the presentation unit includes processing of presenting the site where the determination of the one abnormality is possible by installing the sensor at the sensor installation location.

12. The failure diagnosis system according to claim 11, wherein the presentation processing by the presentation unit includes presenting a schematic diagram of the diagnosis target device showing the site where the determination of the one abnormality is possible by installing the sensor at the sensor installation location.

13. The failure diagnosis system according to claim 11, wherein the presentation processing by the presentation unit includes presenting a second diagnostic site that is different from the site where the determination of the one abnormality is possible, and presenting the site where the determination of the one abnormality is possible by installing the sensor at the sensor installation location in a different mode from the second diagnostic site.

14. The failure diagnosis system according to claim 11, further comprising:

a designation reception unit that receives designation of a site from a plurality of candidate sites, wherein the presentation processing by the presentation unit includes presenting information received by the designation reception unit and the site where the determination of the one abnormality is possible by installing the sensor at the sensor installation location, at the same time.

15. The failure diagnosis system according to claim 14, wherein the information received by the designation reception unit includes model information of the diagnosis target device and an item number or a type of the sensor.

16. A failure diagnosis system comprising:

a sensor that is provided in a diagnosis target device and detects diagnosis target information of the diagnosis target device;

an abnormality determination unit that determines whether one abnormality from a plurality of abnormalities occurs in the diagnosis target device based on the diagnosis target information detected by the sensor;

a storage unit that stores two or more sites of the diagnosis target device where determination of the one abnormality is possible and one or more sensor installation locations where the sensor needs to be installed for the determination of the one abnormality at the two or more sites; and a presentation unit that executes predetermined presentation processing, wherein the presentation processing by the presentation unit includes presenting a correspondence relationship between two or more sites of the diagnosis target device where the determination of the one abnormality is possible and the one or more sensor installation locations where the sensor needs to be installed for the determination of the one abnormality at the two or more sites.

17. The failure diagnosis system according to claim 16, wherein the storage unit stores the two or more sites of the diagnosis target device where the determination of the one abnormality is possible and the one or more sensor installation locations where the sensor needs to be installed for the determination of the one abnormality at the two or more sites, for each piece of model information of the diagnosis target device, wherein the failure diagnosis system further comprises a designation reception unit that receives designation of specific model information, and wherein the presentation unit executes the presentation processing for the diagnosis target device corresponding to the specific model information.

18. The failure diagnosis system according to claim 16, wherein the presentation processing by the presentation unit includes processing of presenting a recommended sensor installation location from the one or more sensor installation locations where the sensor is recommended to be installed for the abnormality determination unit to perform the determination of the one abnormality at the two or more sites.

* * * * *